(12) United States Patent
Petty et al.

(10) Patent No.: US 8,418,473 B2
(45) Date of Patent: Apr. 16, 2013

(54) PIVOTING LINER HANGER

(75) Inventors: Dale William Petty, Wallingford, CT (US); Gonzalo F. Martinez, Stuart, FL (US)

(73) Assignee: United Technologies Corporation, Hartford, CT (US)

(*) Notice: Subject to any disclaimer, the term of this patent is extended or adjusted under 35 U.S.C. 154(b) by 861 days.

(21) Appl. No.: 12/131,292

(22) Filed: Jun. 2, 2008

(65) Prior Publication Data

US 2009/0293498 A1   Dec. 3, 2009

(51) Int. Cl.
F02C 7/20 (2006.01)

(52) U.S. Cl.
USPC ............ 60/796; 60/797; 60/798; 60/799; 403/144

(58) Field of Classification Search ........... 60/798, 60/752, 770, 799, 226.1, 796, 797, 800; 403/144
See application file for complete search history.

(56) References Cited

U.S. PATENT DOCUMENTS

| | | | |
|---|---|---|---|
| 3,563,564 A * | 2/1971 | Bartkowiak | 280/93.512 |
| 4,121,768 A | 10/1978 | Young | |
| 4,466,755 A * | 8/1984 | Smith | 403/36 |
| 5,059,055 A | 10/1991 | DeGress et al. | |
| 5,067,324 A | 11/1991 | Beytes et al. | |
| 5,088,279 A * | 2/1992 | MacGee | 60/226.1 |
| 5,239,815 A | 8/1993 | Bareza | |
| 5,291,732 A | 3/1994 | Halila | |
| 5,509,749 A * | 4/1996 | Eifert et al. | 403/144 |
| 5,782,294 A | 7/1998 | Froemming et al. | |
| 6,442,929 B1 * | 9/2002 | Kraft et al. | 60/39.827 |
| 6,912,782 B2 | 7/2005 | Nguyen et al. | |
| 7,007,480 B2 | 3/2006 | Nguyen et al. | |
| 7,017,334 B2 | 3/2006 | Mayer et al. | |
| 7,089,748 B2 * | 8/2006 | Tiemann | 60/800 |
| 7,093,440 B2 | 8/2006 | Howell et al. | |
| 7,281,695 B2 * | 10/2007 | Jordan | 248/274.1 |
| 7,338,244 B2 | 3/2008 | Glessner et al. | |
| 2005/0155352 A1 | 7/2005 | Agg | |
| 2007/0158527 A1 | 7/2007 | Farah et al. | |
| 2008/0022689 A1 | 1/2008 | Farah et al. | |

* cited by examiner

*Primary Examiner* — William H Rodriguez
*Assistant Examiner* — Steven Sutherland
(74) *Attorney, Agent, or Firm* — Carlson, Gaskey & Olds PC

(57) ABSTRACT

An exemplary turbine engine link assembly includes a link extending longitudinally from a rod end and terminating at a hemispherical end. The rod end is secured to an engine liner or an engine casing. The hemispherical end is biased toward a corresponding hemispherical recess in the engine liner or in the other of the engine liner or the engine casing.

19 Claims, 4 Drawing Sheets

US 8,418,473 B2

PIVOTING LINER HANGER

BACKGROUND

This invention relates to a pivotable link for securing a liner within a gas turbine engine.

As known, an exhaust section of a typical gas turbine engine includes a removable liner secured relative to an exhaust duct. The liner positioned within the exhaust duct isolates the exhaust duct from the thermal energy of flow through the exhaust. Securing the liner within the exhaust duct is often difficult due to the engine's complex manufacturing tolerances and complicated flow paths. Liner securing strategies must further accommodate thermal energy induced fluctuations of the liner due to heated flow through the exhaust. Liners in other sections of the engine face similar issues.

Some liner securing strategies include liner hanger assemblies including links. The exhaust liner is connected to one end of the hangers; the other end of the hangers is connected to the exhaust duct. Current hangers typically include features for accommodating movement of the exhaust liner relative to the exhaust duct. These features are often complex, expensive to manufacture, and difficult to install within the engine.

SUMMARY

An example turbine engine assembly includes a first attachment structure secured to an engine casing or an engine liner. A second attachment structure is secured to the other of the engine casing or the engine liner. The assembly further includes a link having a rod portion extending longitudinally from a hemispherical end portion and terminating at a rod end portion. The hemispherical end portion is received within a recess defined by the first attachment structure. The rod end portion is secured relative to the second attachment structure to limit relative movement between the engine casing and the engine liner.

An example link for securing an engine liner within a turbine engine includes a link having a rod portion extending longitudinally between a partially spherical end portion and a rod end portion. The partially spherical end portion is received within the recess defined by the first attachment structure, which is secured to an engine casing or an engine liner. The rod end portion is held by a second attachment structure, which is secured to the other of the engine casing on the engine liner. The link limits relative movement between the engine casing and the engine liner.

An example arrangement for securing a turbine engine liner includes an engine housing secured to an engine casing, and a liner housing secured to an engine liner. A link extends longitudinally between a rod end portion and a spherical end portion. The hemispherical end portion contacts a recess defined within an interior of the engine housing or the liner housing to limit movement of the link. The rod end portion is secured adjacent an interior of the other of the engine housing and the liner housing. The link contacts the engine housing and the liner housing to limit relative movement between the engine casing and the engine liner.

An exemplary turbine engine link assembly includes a link extending longitudinally from a rod end and terminating at a hemispherical end. The rod end is secured to an engine liner or an engine casing. The hemispherical end is biased toward a corresponding hemispherical recess in the engine liner or in the other of the engine liner or the engine casing.

Another example turbine engine assembly includes a first attachment structure of an engine liner and a second attachment of an engine casing. The engine liner and the engine casing together establish a bypass flow path of a turbine engine. A link is radially bounded by the engine liner and the engine casing. The link has a rod portion extending longitudinally from a hemispherical end portion and terminating at a rod end portion. The hemispherical end portion is received within a hemispherical recess defined by the first attachment structure. The rod end portion is secured relative to the second attachment structure.

These and other features of the example disclosure can be best understood from the following specification and drawings, the following of which is a brief description.

DETAILED DESCRIPTION OF THE PREFERRED EMBODIMENT

Figure 1:
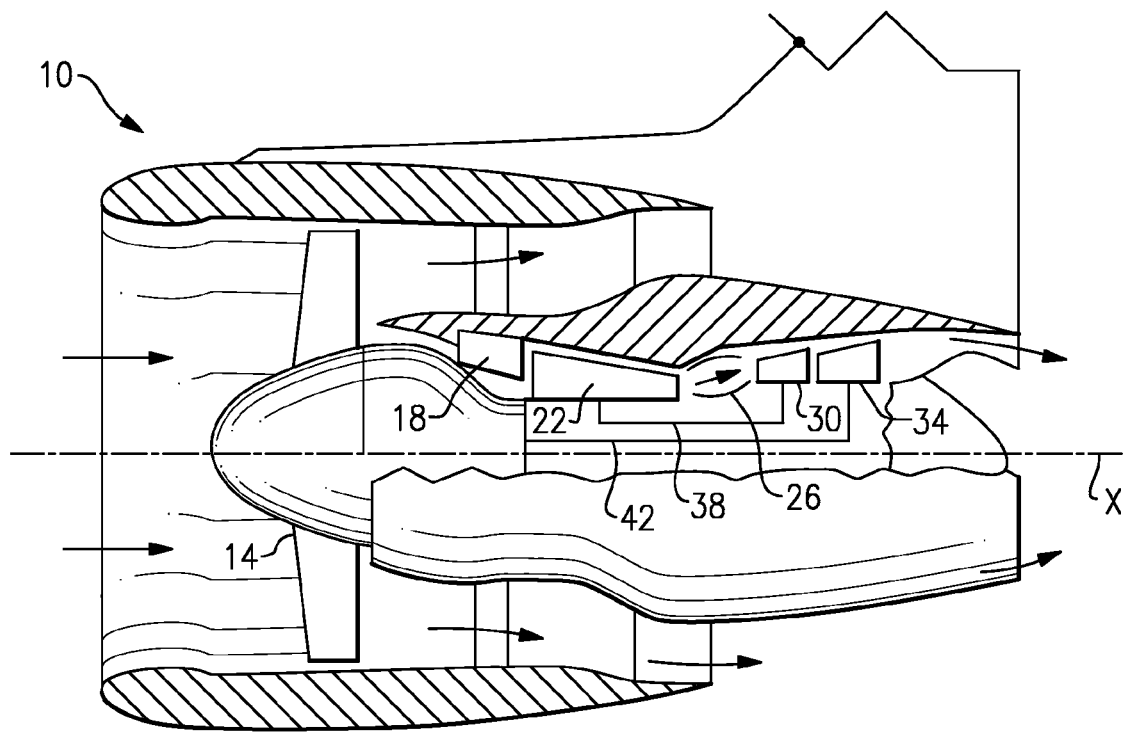
FIG. 1 schematically shows a sectional view of an example gas turbine engine.

FIG. 1 schematically illustrates an example gas turbine engine 10 including (in serial flow communication) a fan section 14, a low pressure compressor 18, a high pressure compressor 22, a combustor 26, a high pressure turbine 30, and a low pressure turbine 34. The gas turbine engine 10 is circumferentially disposed about an engine centerline X. During operation, the fan section 14 intakes air, and the compressors 18, 22 pressurize the air. The combustor 26 burns fuel mixed with the pressurized air. The high and low pressure turbines 30, 34 extract energy from the combustion gases flowing from the combustor 26.

In a two-spool design, the high pressure turbine 30 utilizes the extracted energy from the hot combustion gases to power the high pressure compressor 22 through a high speed shaft 38, and a low pressure turbine 34 utilizes the energy extracted from the hot combustion gases to power the low pressure compressor 18 and the fan section 14 through a low speed shaft 42.

The example method is not applied only to components within the two-spool gas turbine architecture described above and may be used with other architectures such as a single spool axial design, a three spool axial design, and other architectures. That is, there are various types of gas turbine engine component and components within other systems, many of which could benefit from the examples disclosed herein.

Figure 2:
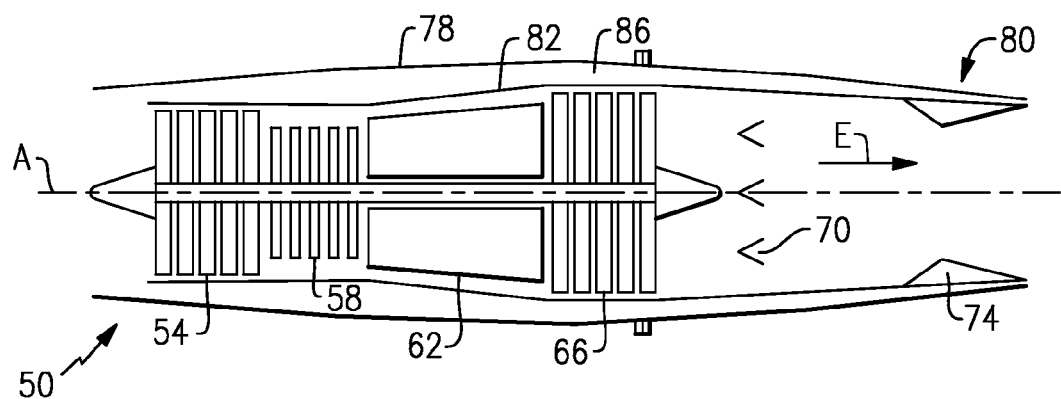
FIG. 2 schematically shows another example gas turbine engine.

Referring to the FIG. 2 schematic, an example turbo jet engine 50, another type of engine architecture, includes a fan section 54, a compressor section 58, a combustor section 62, a turbine section 66, an augmenter section 70, and a nozzle section 74. The compressor section 58, combustor section 62, and turbine section 66 are often referred to as the core engine. An axis A of the engine 50 is generally disposed and extends longitudinally through the sections. An engine duct structure 78, or engine casing, and an inner cooling liner structure 82 provide an annular secondary fan bypass flow path 86 around a primary exhaust flow path E within an exhaust section 80 of the engine 50. The bypass flow path 86 receives bypass flow from the fan section 54.

Figure 3:
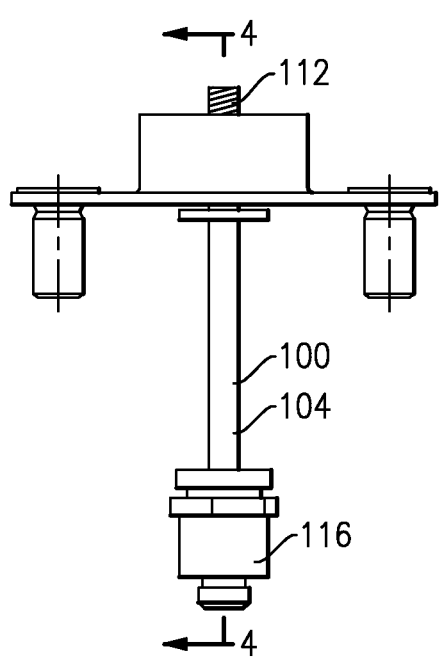
FIG. 3 shows a side view of an example liner assembly.
Figure 4:
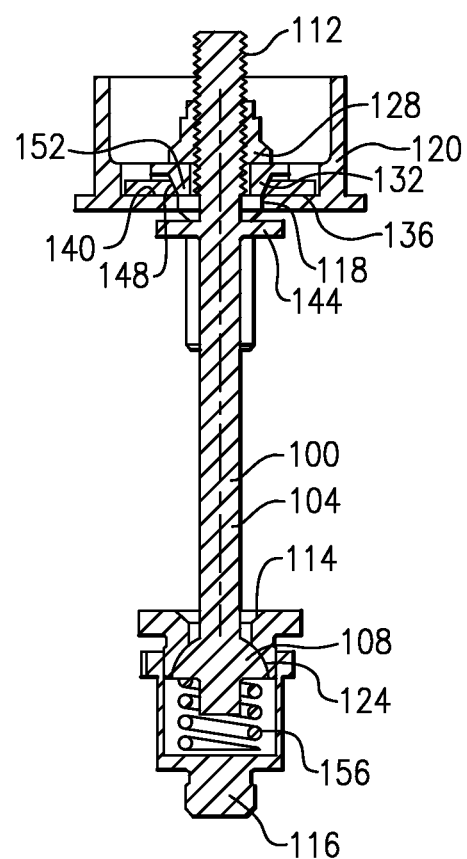
FIG. 4 shows a sectional view through line 4-4 of FIG. 3.

Referring now to FIGS. 3 and 4 with continuing reference to FIG. 2, an example link 100 for securing the liner structure 82 relative to the engine duct structure 78 includes a longitudinally extending rod 104. One end of the rod 104 terminates at a hemispherical end 108. The other end of the rod 104 terminates at a rod end portion 112. In this example, the rod 104 extends though a first aperture 114 defined by the first attachment structure 116 to position the hemispherical end 108 within the first attachment structure 116. The rod 104 also extends through a second aperture 118 defined by a second attachment structure 120 to position the rod end portion 112 within the second attachment structure 120.

A first recessed area 124 within the first attachment structure 116 holds the hemispherical end 108 to limit movement of the link 100 away from the first attachment structure 116. That is, the hemispherical end 108 of the link 100 contacts the first recessed area 124 to limit further movement of the link 100 away from the first attachment structure 116. The hemispherical end 108 pivots and rotates within the first recessed area 124 facilitating pivoting the link 100 about the first attachment structure 116. In this example, the first recessed area 124 acts as a socket for receiving the hemispherical end 108.

Movement of the example link 100 away from the second attachment structure 120 is similarly limited, but in a slightly different manner. In this example, a retaining feature 128 threadably connects to the rod end portion 112 to hold a hemispherical washer 132 near the rod end portion 112 within the second attachment structure 120. A washer face 136 of the hemispherical washer 132 contacts an inner wall 140 of the second attachment structure 120 to limit movement of the link 100 away from the second attachment structure 120.

A second recessed area 148 within the hemispherical washer 132 receives a hemispherical portion 152 of the hemispherical washer 132 to facilitate pivoting the link 100 relative to the second attachment structure 120. As known, the hemispherical washer 132 permits pivoting type movements of the link 100 relative to the second attachment structure 120 similar to the hemispherical end 108 captured within the first recessed area 124. Together, the hemispherical washer 132 and the hemispherical end 108 of the link 100 accommodate pivoting movements of the first attachment structure 116 relative to the second attachment structure 120.

In this example, the first attachment structure 116 is secured directly to the liner structure 82 (FIG. 2) and the second attachment structure 120 is secured directly to the engine duct structure 78. The liner structure 82 thus remains secured relative to the duct structure 72 even when the liner structure 82 moves relative the duct structure 72. Example relative movements include expansion or contraction of the liner structure 82 due to thermal growth within engine 50.

As the hemispherical washer 132 is added to the rod end portion 112, manufacturing the example link 100 does not require complex machining processes to provide pivoting movement of the link 100 relative to the second attachment structure. Further, as the hemispherical end 108 of the rod 104, not the rod end portion 112, is enlarged, the rod end portion 112 is insertable within the second aperture 118, which simplifies assembly.

In this example, a collar 144 disposed about the rod 104 limits movement of the link 100 toward the second attachment structure 120. Further, the first attachment structure 116 houses a spring 156 for biasing the hemispherical end 108 of the link 100 toward the first recessed area 124.

Figure 5:
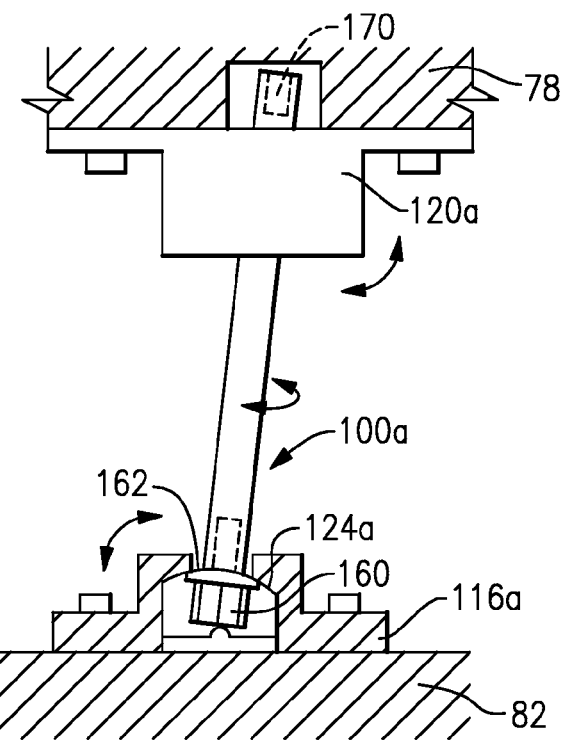
FIG. 5 shows a partial sectional view of another example liner hanger assembly having an alternative link.
Figure 5A:
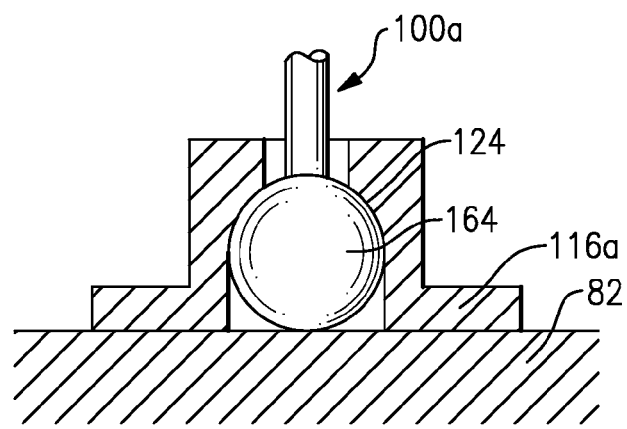
FIG. 5A shows another alternative link for the FIG. 5A liner hanger assembly.
Figure 5B:
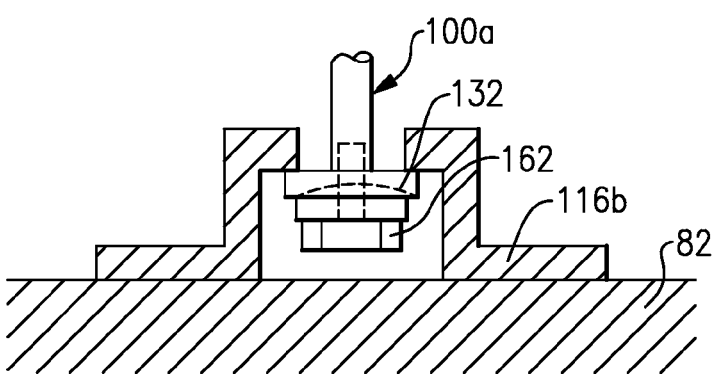
FIG. 5B shows yet another alternative link for the FIG. 5 liner hanger assembly.

Referring now to FIGS. 5-5B, in another example, a link 100a incorporates a spherical bolt 160 to facilitate pivoting the link 100a. A crowned area 162 of the spherical bolt 160 is received within a first recessed area 124a of a first attachment structure 116a. The crowned area 162 of the spherical bolt 160 moves within the first recessed area 124a to facilitate pivoting and rotating the link 100a relative the first attachment structure 116a. Other examples include an entirely spherical end portion 164 received within the first recessed area 124a, as shown in FIG. 5A, instead of the spherical bolt 160. Still other examples include a hemispherical washer 132a secured directly to the link 100a using a non-spherical bolt 162 or another suitable fastener, as shown in FIG. 5B, instead of the spherical bolt 160. The link 100a may include a hex type recess 170 for a tool (not shown) to hold the link 100a when installing the spherical bolt 160 or the non-spherical bolt 162.

Figure 6:
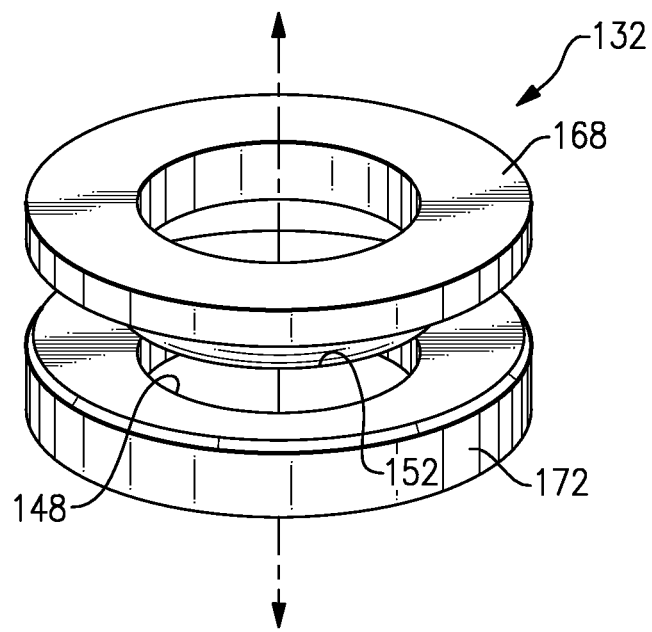
FIG. 6 shows a perspective view of the FIGS. 4 and 5B hemispherical washer assembly.
Figure 7:
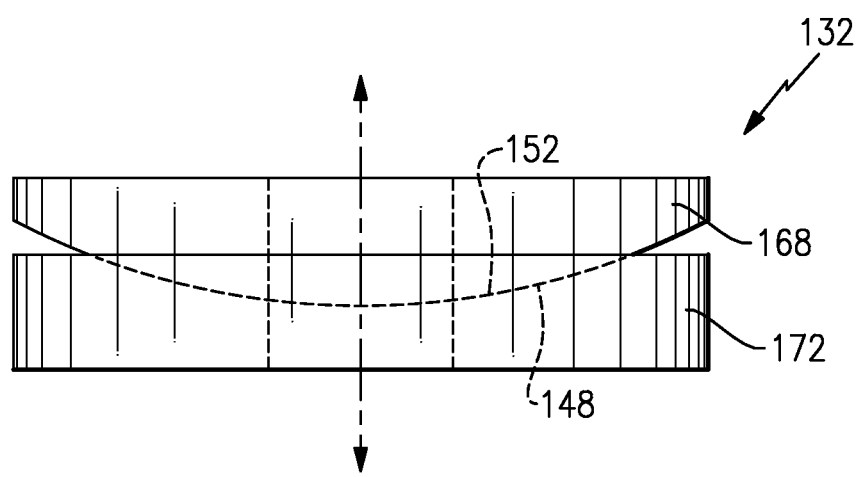
FIG. 7 shows a side view of the FIGS. 4 and 5B hemispherical washer assembly.

Referring now to FIGS. 6 and 7, the example hemispherical washer 132 includes the hemispherical portion 152 extending within the second recessed area 148. The hemispherical portion 152 moves against the second recessed area 148 to permit movement of an upper washer 168 relative to a lower washer 172, which facilitates moving the link 100 (FIGS. 3 and 4) in a similar manner to the hemispherical end 108 moving within the recessed area 124.

Although a preferred embodiment has been disclosed, a worker of ordinary skill in this art would recognize that certain modifications would come within the scope of this invention. For that reason, the following claims should be studied to determine the true scope and content of this invention.

We claim:

1. A turbine engine assembly comprising:
   a first attachment structure secured directly to an engine liner;
   a second attachment structure secured directly to an engine casing, wherein the engine liner and the engine casing together establish a bypass flowpath of a turbine engine;
   a link having a rod portion extending longitudinally from a hemispherical end portion and terminating at a rod end portion, the hemispherical end portion received within a recess defined by the first attachment structure, the rod end portion secured relative to the second attachment structure; and
   a spring biasing the hemispherical end portion toward the recess defined by the first attachment structure, the hemispherical end portion extending away from the rod portion and terminating at a leading surface that does not extend past a perimeter of the hemispherical end portion, wherein the spring contacts the leading surface of the hemispherical end portion and the spring is housed within the first attachment structure.

2. The turbine engine assembly of claim 1 wherein the hemispherical end portion is removeably securable to the rod portion.

3. The turbine engine assembly of claim 1 including a hemispherical washer removeably secured to the rod end portion, the hemispherical washer received within a second recess defined by the second attachment structure.

4. The turbine engine assembly of claim 3 including a retainer feature removeably securable to the rod end portion, the retainer feature securing the hemispherical washer to the first end of the link.

5. The turbine engine assembly of claim 4 wherein rod end portion includes a threaded portion for engaging the retainer feature.

6. The turbine engine assembly of claim 3, wherein the hemispherical washer and the hemispherical end portion are both removeably secureable to the rod portion.

7. The turbine engine assembly of claim 3, wherein at least one of the hemispherical washer or the hemispherical end portion are spherical.

8. The turbine engine assembly of claim 1, wherein the link extends across an annular bypass flow path established between the engine liner and the engine casing.

9. The turbine engine assembly of claim 1, including a collar of the link, the collar configured to limit longitudinal movement of the link toward the second attachment structure.

10. The turbine engine assembly of claim 1, wherein the first attachment structure and the second attachment structure are radially aligned relative to an axis of rotation of the turbine engine assembly.

11. The turbine engine assembly of claim 1, wherein the link extends across a bypass flow path and is positioned radially between the engine liner and the engine casing.

12. The turbine engine assembly of claim 1, wherein the recess is a hemispherical recess and the hemispherical end portion is in direct contact with the hemispherical recess.

13. The turbine engine assembly of claim 1, wherein the link supports the engine liner relative to the engine casing.

14. A turbine engine link assembly, comprising:
a link extending longitudinally from a rod end and terminating at a hemispherical end, the rod end secured to one of an engine liner or an engine casing, the hemispherical end biased by a spring toward a corresponding hemispherical recess provided by the other of the engine liner or the engine casing, wherein the link extends across a bypass flow path of a gas turbine engine and is positioned radially between an engine casing and an engine liner.

15. The turbine engine line assembly of claim 14, wherein the hemispherical end engages a first attachment structure of the engine liner, and the rod end is received within a recess of an second attachment structure of the engine casing.

16. The turbine engine link assembly of claim 14, wherein a spring biases the hemispherical end and the spring is housed within the first attachment structure.

17. The turbine engine link assembly of claim 14, wherein the hemispherical end portion extends away from the rod end and terminates at a leading surface that does not extend past a perimeter of the hemispherical end portion, wherein the spring contacts the leading surface of the hemispherical end portion.

18. A turbine engine assembly, comprising:
a first attachment structure of an engine liner;
a second attachment structure of an engine casing, the engine liner and the engine casing together establishing a bypass flowpath of a turbine engine;
a link radially bounded by the engine liner and the engine casing, the link having a rod portion extending longitudinally from a hemispherical end portion and terminating at a rod end portion, the hemispherical end portion received within a hemispherical recess defined by the first attachment structure, the rod end portion secured relative to the second attachment structure; and a spring biasing the hemispherical end portion of the link toward the hemispherical recess defined by the first attachment structure.

19. The turbine engine assembly of claim 18, wherein the link supports the engine liner relative to the engine casing.

* * * * *